(12) United States Patent
Weihs et al.

(10) Patent No.: US 10,087,118 B2
(45) Date of Patent: Oct. 2, 2018

(54) REACTIVE COMPOSITE FOIL

(71) Applicant: THE JOHNS HOPKINS UNIVERSITY, Baltimore, MD (US)

(72) Inventors: Timothy P. Weihs, Baltimore, MD (US); Alex H. Kinsey, Baltimore, MD (US); Kyle A. Slusarski, Joppa, MD (US); Karsten Woll, Karlsruhe (DE); David Gibbins, Towson, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 282 days.

(21) Appl. No.: 14/954,508

(22) Filed: Nov. 30, 2015

(65) Prior Publication Data
US 2016/0152526 A1 Jun. 2, 2016

Related U.S. Application Data

(60) Provisional application No. 62/085,401, filed on Nov. 28, 2014.

(51) Int. Cl.
| C06B 45/14 | (2006.01) |
| C06B 33/00 | (2006.01) |
| C06B 45/00 | (2006.01) |
| C06B 21/00 | (2006.01) |
| B23K 1/00 | (2006.01) |
| B23K 35/02 | (2006.01) |
| B23K 35/28 | (2006.01) |
| B23K 35/30 | (2006.01) |
| B23K 35/32 | (2006.01) |
| C06B 45/12 | (2006.01) |
| C06B 37/00 | (2006.01) |
| D03D 23/00 | (2006.01) |
| D03D 43/00 | (2006.01) |

(52) U.S. Cl.
CPC ............ *C06B 33/00* (2013.01); *B23K 1/0006* (2013.01); *B23K 35/0222* (2013.01); *B23K 35/0238* (2013.01); *B23K 35/0244* (2013.01); *B23K 35/286* (2013.01); *B23K 35/3033* (2013.01); *B23K 35/325* (2013.01); *C06B 21/0033* (2013.01); *C06B 45/00* (2013.01); *C06B 45/14* (2013.01)

(58) Field of Classification Search
CPC ...................................................... C06B 33/00
USPC .................... 149/15, 14, 37, 108.2, 109.4
See application file for complete search history.

(56) References Cited

U.S. PATENT DOCUMENTS

| 6,316,125 | B1 | 11/2001 | Gaman et al. |
| 6,534,194 | B2 | 3/2003 | Weihs et al. |
| 6,991,856 | B2 | 1/2006 | Weihs et al. |
| 7,361,412 | B2 | 4/2008 | Wang et al. |
| 7,441,688 | B2 | 10/2008 | Heerden et al. |
| 7,524,355 | B2 | 4/2009 | Dreizin et al. |
| 8,177,878 | B2 | 5/2012 | Heinrich et al. |
| 8,299,630 | B2 | 10/2012 | Braeuer et al. |
| 2001/0046597 | A1 | 11/2001 | Weihs et al. |
| 2011/0027547 | A1* | 2/2011 | Xun ........................ B32B 15/01 428/201 |

* cited by examiner

Primary Examiner — James E McDonough
(74) Attorney, Agent, or Firm — MH2 Technology Law Group LLP

(57) ABSTRACT

A reactive composite foil, including metallic fuel particles, oxidizer particles, and a diluent, which, when ignited, produces a self-propagating thermite reaction to produce a molten metal.

18 Claims, 15 Drawing Sheets

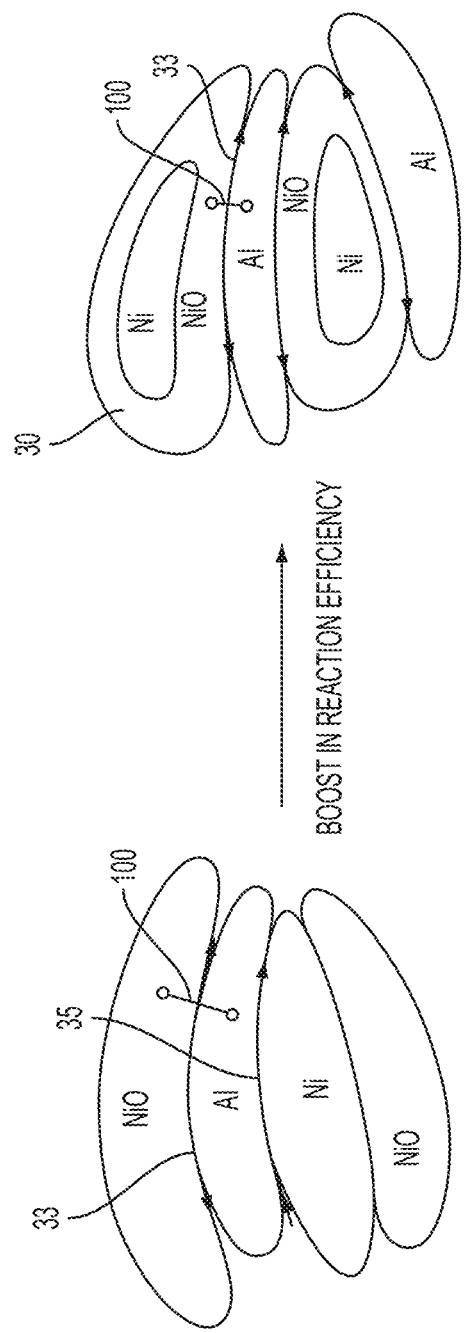

REACTIVE COMPOSITE FOIL

RELATED APPLICATION

This application claims priority to U.S. Provisional Application No. 62/085,401 filed Nov. 28, 2014, the disclosure which is hereby incorporated by reference in its entirety.

U.S. GOVERNMENT RIGHTS

This invention was made with government support under contract No. DE-EE0006441 awarded by the Department of Energy National Energy Technology Lab. The government has certain rights in the invention.

FIELD OF DISCLOSURE

This disclosure relates to reactive composites, and more particularly to reactive composites for bonding.

BACKGROUND

The last two decades have seen the development and commercialization of reactive, self-propagating multilayer foils as local heat sources for joining materials. When used in conjunction with solder or braze, these foils can join components together without heating either component significantly, as only the region near the interface is heated. This is useful for joining dissimilar materials, which may have very different melting temperatures and coefficients of thermal expansion. However, the standard practice of pre-wetting components with solder or coating them with inert metal layers such as Au or Ag adds cost, slows dissemination of the technology, and limits bond strength. Accordingly, there is a need for strong bonds that can be formed without pre-wetting or metallizing the components to be bonded.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Additional goals and advantages will become more evident in the description of the figures, the detailed description of the disclosure, and the claims.

The foregoing and/or other aspects and utilities embodied in the present disclosure may be achieved by providing a reactive composite foil, including a reactant comprising a plurality of metallic fuel particles and a plurality of oxidizer particles; and a diluent, wherein, the reactive composite foil produces a thermite reaction to produce a molten metal when ignited, the reactive composite foil has a first mass before the thermite reaction and a second mass after the thermite reaction, and, the diluent reduces an amount of gas during the thermite reaction, such that when ignited in an inert environment, the second mass is less than the first mass by 5% or less.

In another embodiment, the diluent is configured to act as a heat sink to reduce a maximum reaction temperature of the thermite reaction.

In another embodiment, the thermite reaction is a self-propagating thermite reaction.

In another embodiment, the reactive composite foil is configured to bond two materials via the thermite reaction without requiring pre-wetting or metallization of the materials to be bonded.

In another embodiment, a thickness of the reactive composite foil is between 50 µm and 1500 µm.

In another embodiment, when ignited in an inert environment, the second mass is less than the first mass by 0.5% or less.

In another embodiment, the plurality of oxidizer particles include metal oxides, and the diluent comprises the metal of said metal oxides.

In another embodiment, the reactant includes a plurality of composite particles formed of milled metallic fuel particles and oxidizer particles.

In another embodiment, the plurality of oxidizer particles include a plurality of partially pre-oxidized (PPO) metal particles, the PPO metal particles include a metal and a metal oxide surrounding the metal.

In another embodiment, the metal oxide of the PPO metal particles completely surrounds the metal of the PPO metal particles.

In another embodiment, the reactive composite foil further includes a metallic clad layer.

In another embodiment, when the reactive composite foil is used to bond materials, the metallic clad layer is configured to wet the materials to be bonded and to act as a braze.

In another embodiment, an average particle size of at least one of the plurality of metallic fuel particles and the plurality of oxidizer particles is less than 200 µm in diameter, an average spacing between the metallic fuel particles and the oxidizer particles is less than 10 µm, and an average distance between the diluent and the reactants is less than 100 µm.

In another embodiment, the average particle size of at least one of the plurality of metallic fuel particles and the plurality of oxidizer particles is less than 100 µm in diameter, the average spacing between the metallic fuel particles and the oxidizer particles is less than 5 µm, the average distance between the diluent and the reactants is less than 30 µm, a thickness of the reactive composite foil is between 50 µm and 800 µm, and, when ignited in an inert environment, the second mass is less than the first mass by 0.1% or less.

The foregoing and/or other aspects and utilities embodied in the present disclosure may be achieved by providing a reactive composite foil, including a reactant comprising a plurality of metallic fuel particles and a plurality of oxidizer particles; and a diluent in an amount sufficient to reduce gas produced by a thermite reaction, wherein an average spacing between the metallic fuel particles and the oxidizer particles is less than 10 µm, an average distance between the diluent and the reactants is less than 100 µm, and the reactive composite foil produces the thermite reaction to produce a molten metal when ignited.

In another embodiment, an average particle size of at least one of the plurality of metallic fuel particles and the plurality of oxidizer particles is less than 100 µm in diameter, the average spacing between the metallic fuel particles and the oxidizer particles is less than 5 µm, the average distance between the diluent and the reactants is less than 30 µm, a thickness of the reactive composite foil is between 50 µm and 800 µm, the reactive composite foil has a first mass before the thermite reaction and a second mass after the thermite reaction, and, when ignited in an inert environment, the second mass is less than the first mass by 1% or less.

In another embodiment, the diluent is configured to act as a heat sink to reduce a maximum reaction temperature of the thermite reaction of the reactive composite foil.

In another embodiment, the plurality of oxidizer particles comprise a plurality of partially pre-oxidized (PPO) metal particles, the PPO metal particles comprising a metal and a metal oxide surrounding the metal.

The foregoing and/or other aspects and utilities embodied in the present disclosure may be achieved by providing a method of making a reactive composite foil, including mixing a reactant comprising a plurality of metallic fuel particles and a plurality of oxidizer particles with a diluent to form a mixture; compacting the mixture within a removable tube; swaging the removable tube to a small diameter; flattening the swaged removable tube into a thin strip; and removing the flattened removable tube to reveal a reactive composite foil, wherein, the reactive composite foil produces a thermite reaction to produce a molten metal when ignited, the reactive composite foil has a first mass before the thermite reaction and a second mass after the thermite reaction, and, the diluent reduces an amount of gas during the thermite reaction, such that when ignited in an inert environment, the second mass is less than the first mass by 5% or less.

In another embodiment, an average spacing between the metallic fuel particles and the oxidizer particles is less than 10 μm in the reactive composite foil, an average distance between the diluent and the reactants is less than 100 μm in the reactive composite foil, and, when ignited in an inert environment, the second mass is less than the first mass by 0.5% or less.

BRIEF DESCRIPTION OF THE DRAWINGS

These and/or other aspects and advantages in the embodiments of the disclosure will become apparent and more readily appreciated from the following description of the various embodiments, taken in conjunction with the accompanying drawings of which:

FIGS. 3A and 3B illustrate an increase of reactive interfaces according to an embodiment.

Figure 1:
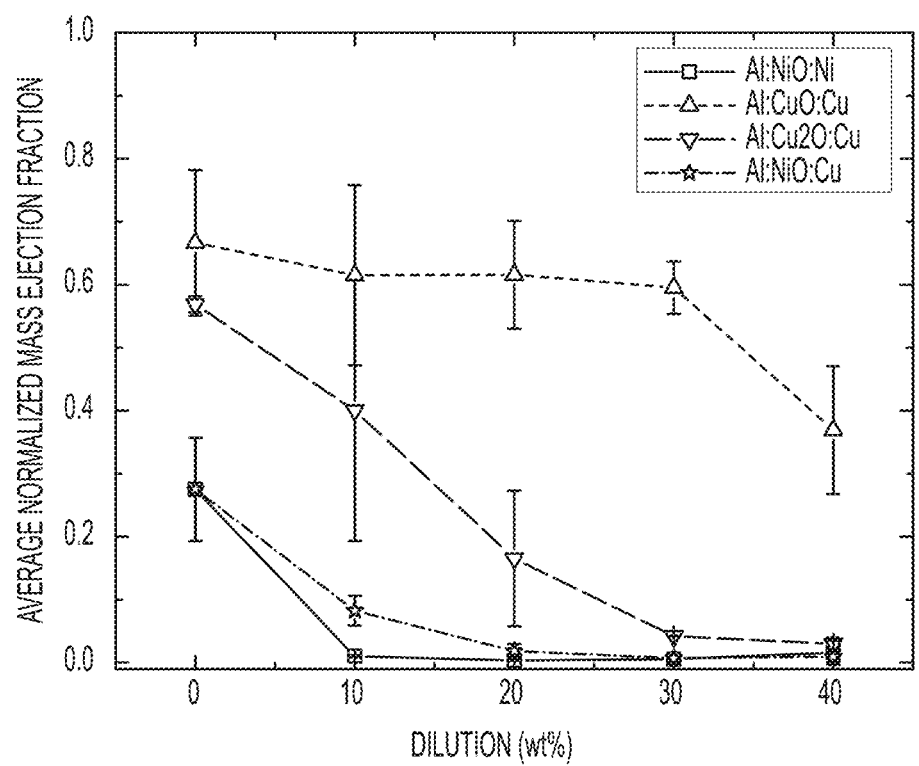
FIG. 1 illustrates diluent effects on material ejection for thermite systems.

It should be noted that some details of the drawings have been simplified and are drawn to facilitate understanding of the present teachings rather than to maintain strict structural accuracy, detail, and scale.

The drawings above are not necessarily to scale, with emphasis instead generally being placed upon illustrating the principles in the present disclosure. Further, some features may be exaggerated to show details of particular components. These drawings/figures are intended to be explanatory and not restrictive.

DETAILED DESCRIPTION

Reference will now be made in detail to the various embodiments in the present disclosure. The embodiments are described below to provide a more complete understanding of the components, processes and apparatuses disclosed herein. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, etc. In addition, throughout the specification, the meaning of "a," "an," and "the" include plural references. The meaning of "in" includes "in" and "on."

All physical properties that are defined hereinafter are measured at 20° to 25° Celsius unless otherwise specified. The term "room temperature" refers to 25° Celsius unless otherwise specified.

When referring to any numerical range of values herein, such ranges are understood to include each and every number and/or fraction between the stated range minimum and maximum. For example, a range of 0.5-6% would expressly include all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

In one embodiment, the inventors have developed novel reactive composites that use thermite reactions to overcome the drawbacks of previous reactive foils. For example, in bonding with reactive foils, such as Al/Ni, pre-wetting is needed because the reactive foil does not produce its own braze. To bond components, however, often a metallization step is needed to improve the adhesion between the melted solder and the components. According to some embodiment, neither step is required for the reactive composite foil in this disclosure because the reaction itself creates its own braze material and the wetting characteristics can be tailored by altering the chemistry of reactive composite foil. The metallization step can be avoided as it is not necessary to promote adhesion to the braze. However, this does not exclude the reactive composite foil from being used to join materials with metallization, such as coated steels for automotive applications, and, while not necessary for some embodiments, the reactive composite foil can be tailored to account for any metallization on the bonding materials or components.

Thermite reactions are a subset of reduction-oxidation (Redox) reactions. In a thermite reaction, a chemically active metal, such as aluminum, reduces a metal oxide, to produce the metal of the metal oxide in an exothermic reaction. If the exothermic heat of reaction is large, the metallic product is molten and can be used as braze for bonding two components. Unfortunately, thermite reactions can rise above the boiling temperature of the reactants, products or diluents and may produce large amounts of gas that can lead to material ejection during bonding and substantial porosity and limited strength in the resulting joints.

In one embodiment, a reactive composite includes a diluent to reduce an amount of gas released during the thermite reaction. For example, one way to reduce the gas release during the thermite reaction is to add diluents such as oxides and metallic elements. The addition of brittle oxides is likely to degrade the strength of any resulting bonds; hence, embodiments in this disclosure minimize gas production by adding excess metal, and therefore minimize material ejection during the thermite reaction.

In one embodiment, the amount of gas generation can be correlated to an amount of mass lost after the thermite reaction occurs in an inert environment. For example, the mass of the composite foil may be measured before and after the thermite reaction.

In one embodiment, when ignited in an inert environment, the reactive composite foil may lose less than 5% of its original mass. In another embodiment, the reactive composite foil may lose less than 1% of its original mass, and in yet another embodiment, the reactive composite foil may lose less than 0.5% of its original mass, or less than 0.1% of its original mass.

FIG. 1 illustrates diluent effects on material ejection for thermite systems. As illustrated in FIG. 1, an average normalized mass ejection for Al:NiO, Al:CuO, and Al:Cu$_2$O reactive composites decreases with dilution. In FIG. 1, the diluent is the metal from the starting oxide or a different metal. In one embodiment, the diluent acts as a heat sink and suppresses the reaction temperature. In other embodiment, the diluent can also increase the average reactant spacing which decreases reactivity.

Figures 2A, 2B:
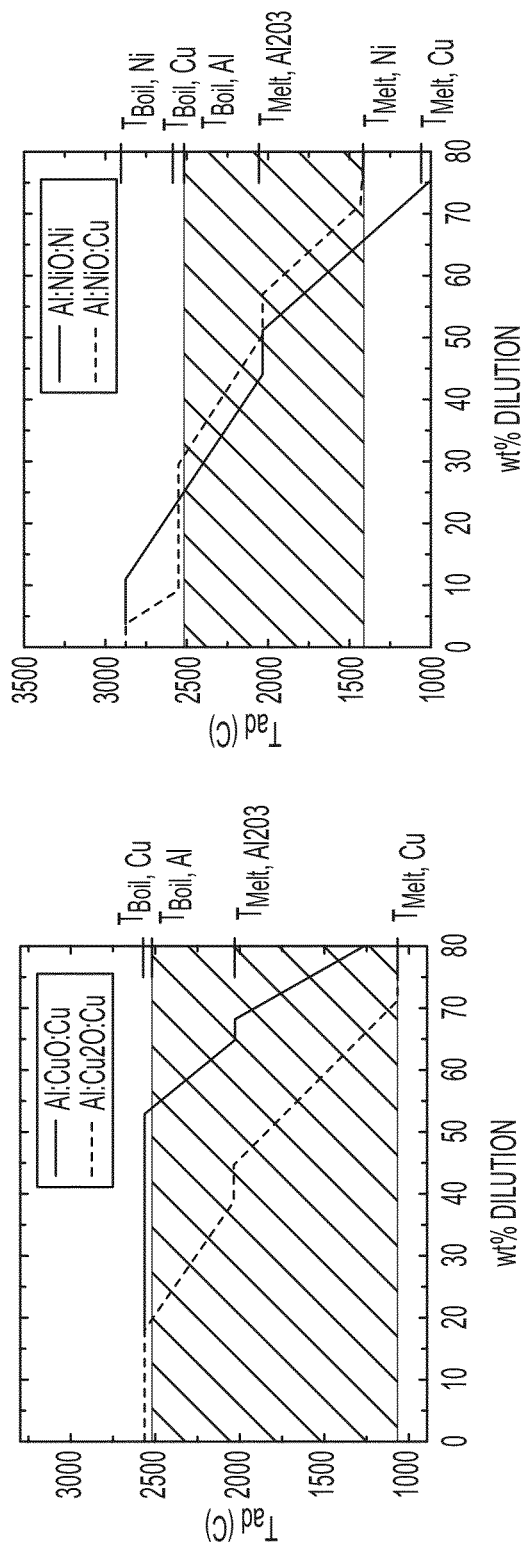
FIGS. 2A and 2B illustrate adiabatic temperatures of thermite reactions as a function of dilution.

FIGS. 2A and 2B illustrate adiabatic temperatures of thermite reactions as a function of dilution. As illustrated in FIGS. 2A and 2B, the shaded regions show the acceptable temperature range, below the boiling points of the constituents and above the melting point of the braze. FIG. 2A illustrates Al:CuO and Al:Cu$_2$O systems diluted with copper. FIG. 2B illustrates an Al:NiO system diluted with either nickel or copper. As illustrated in FIGS. 2A and 2B an adiabatic temperature of copper-based and nickel-based thermite reactions can be plotted as a function of dilution with metal. In some embodiment, comparing the reaction temperatures with the melting and boiling points of the reactants and products, identifies a range of temperatures and dilutions in which each thermite reaction should proceed in the condensed phase. Increasing the amount of diluent provides more braze to the system; however, excessive diluent can reduce the reaction temperature to a point where the composite can no longer self-propagate, particularly within a bonding operation where the foil is placed between two components to be bonded. In this instance, the thermite reaction quenches.

In certain conditions, thermite reactions create metal oxide agglomerates and/or slag. Accordingly one must consider the inclusion of agglomerates, such as alumina agglomerates, as well as the wettability of the joined components by the molten braze, which are both critical to obtaining strong bonds.

In one embodiment, the reactive composite is a heavily diluted thermite reactive composite. In one embodiment, the reactive composite is heavily-diluted but reactive enough to self-propagate through the bond interface. In another embodiment, the reactive composite effectively wets the surfaces of the components to be joined and produces minimal slag during the thermite reaction in order to maximize bond strength.

In one embodiment, the reactive composite foil includes fuel particles, oxidizer particles, and a diluent. In some embodiments, the reactive composite foil includes a cladding layer.

In some embodiments, the fuel particles are metallic particles. In one embodiment, the metallic particles include any metal that forms an oxide and is more stable that the reacting oxidizer particles. For example, in one embodiment, the fuel particles are at least one of Al, B, Be, Hf, La, Li, Mg, Nd, Si, Ta, Th, Ti, Y, and Zr, including combinations and alloys thereof. In another embodiment, the fuel particles are at least one of Al, Ti, and Zr. In one embodiment, the fuel particles are Al.

In some embodiments, the oxidizer particles include any oxide less stable than the oxide formed from the thermite reaction. For example, in one embodiment, the oxidizer particles include one or more of AgO, Ag$_2$O, Cr$_2$O$_3$, CuO, Cu$_2$O, FeO, Fe$_2$O$_3$, Fe$_3$O$_4$, MoO$_3$, MnO, NiO, PbO, PbO$_2$, PdO, PdO$_2$, SnO, SnO$_2$, Ta$_2$O$_5$, and WO$_3$. In another embodiment, the oxidizer particles are one or more of Cr$_2$O$_3$, CuO, Cu$_2$O, FeO, Fe$_2$O$_3$, Fe$_3$O$_4$, NiO, and SnO$_2$. In another embodiment, the oxidizer particles include one or more of NiO, CuO, Cu$_2$O, and FeO$_x$O$_y$.

In some embodiments, the diluent can be any useful metal or alloy. For example, in one embodiment, the diluent include one or more of Al, Ag, Au, Cr, Cu, Fe, In, Mn, Mo, Ni, Nb, Pb, Pd, Sn, Ta, V, W, including combinations and alloys thereof. In another embodiment, the diluent is one or more of Al, Ag, Cr, Cu, Fe, In, Ni, Sn, and their alloys. In one embodiment, the diluent is one or more of Ag, Cu, Ni, Fe, and their alloys.

In one embodiment, a particle size for the fuel particles and/or the oxidizer particles is 200 microns (μm) or less. In another embodiment, the particle size is 100 μm or less. In one embodiment, the particle size is 45 μm or less. In one embodiment, the diluent has a particle size 1000 μm or less; 200 μm or less, or in another embodiment, 45 μm or less.

For self-propagating reactive systems, the distance that species must travel to fully mix and react, the diffusion distance, determines the ignition threshold as well as the propagation velocity of the reactive system. In one embodiment, refining the microstructure, or distance between reactants, allows the reaction to be initiated at lower temperatures and is thus easier to propagate. In addition, distribution of reactant spacing is also an important factor. If reactant spacing is coarsely distributed, with distinct regions of small and large reactant spacings, then propagation behavior is determined by the larger reactant spacing.

In one embodiment, the reactant spacing is the average distance between the fuel particles and the oxidizer particles, and may determine the atomic diffusion distance which governs the rate of the reaction due to atomic mixing. In one embodiment, the distance between the reactants (the fuel particles and the oxidizer particles) and the diluent defines a thermal diffusion distance which may govern how quickly heat generated by the thermite reaction is dissipated into the diluent. In one embodiment, the diluent ensures no localized hot spots which may lead to excessive gas generation and ejection of material.

Figure 14:
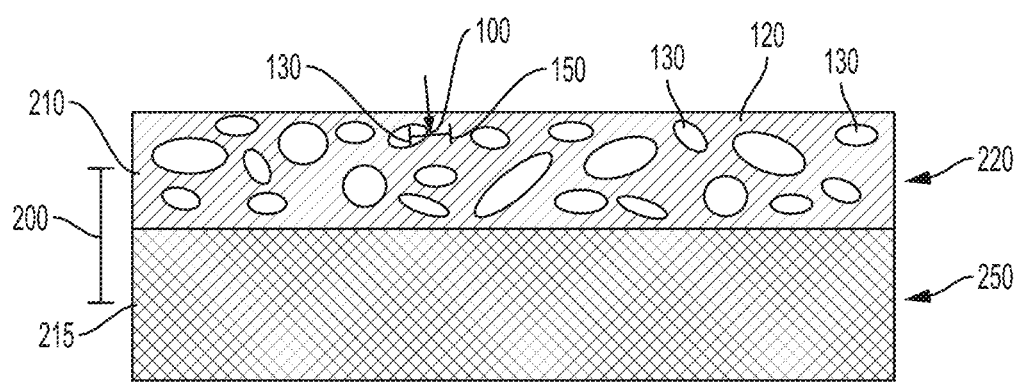
FIG. 14 illustrates a schematic representation of the spacing and distance of the components of the reactive composite.

For example, FIG. 14 illustrates a schematic representation of the spacing between the fuel and oxidizer, and the distance between the reactants and the diluent. As illustrated in FIG. 14, the spacing [100] between the fuel [120] and the oxidizer [130] corresponds to the distance from a center of an oxidizer particle [130] and a mid-point [150] between two oxidizer [130] particles dispersed within the fuel [120], and the average spacing is the average of all the spacings observed, or a representative sample thereof. As illustrated in FIG. 14, the distance [200] between the reactants [220] and the diluent [250] corresponds to a distance between a midpoint among the reactant [210] and a midpoint of the diluent [215], and the average distance is the average of all the distances between the reactants and diluents observed, or a representative sample thereof.

Figure 15:
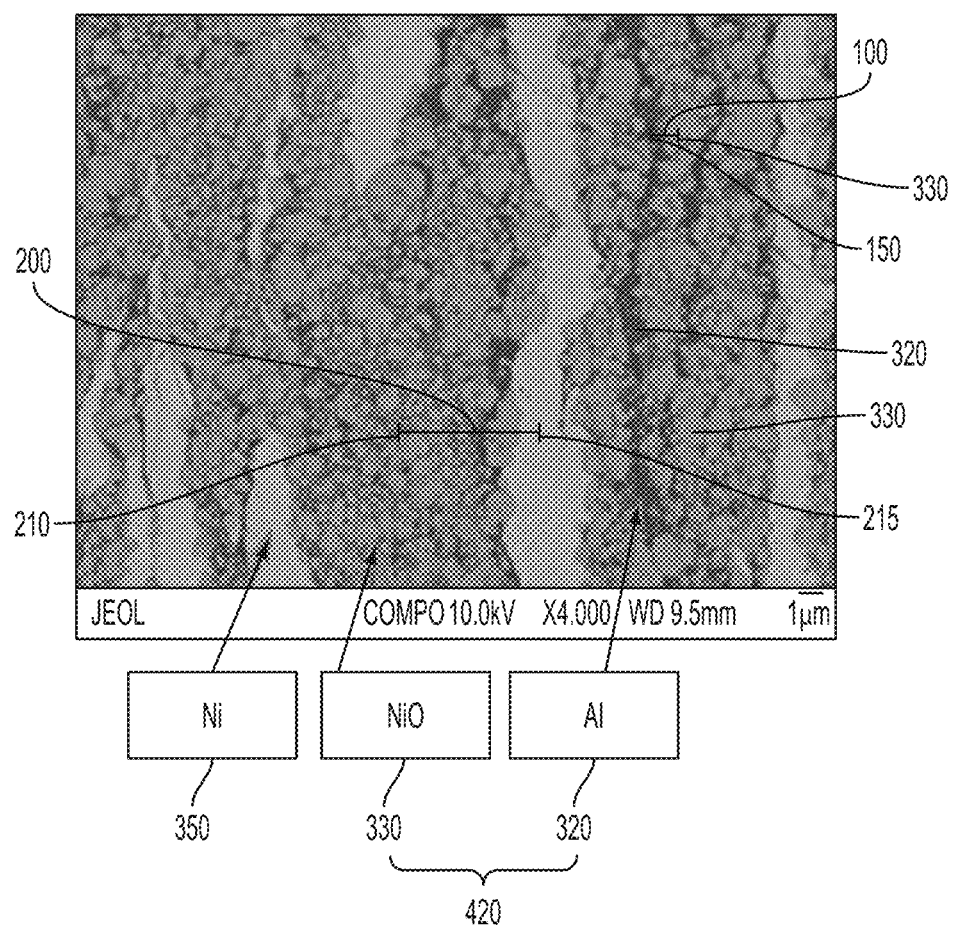
FIG. 15 illustrates an SEM photograph representing the spacing and distance of the components of the reactive composite.

FIG. 15 illustrates an SEM image of an Al:NiO:Ni reactive foil according to an embodiment of the present invention illustrating the average spacing between the fuel and oxidizer, and the average distance between the reactants and the diluent. As illustrated in FIG. 15, the reactive foil includes NiO oxidizer particles [330] dispersed within an Al fuel [320], and a Ni diluent [350]. As illustrated in FIG. 15, the spacing [100] between the Al fuel [320] and the NiO oxidizer particles [330] corresponds to the distance from a center of an NiO oxidizer particle [330] and the mid-point [150] between two oxidizer particles dispersed within the fuel [320], and the average spacing is the average of all the spacings observed, or a representative sample thereof. As illustrated in FIG. 15, the distance [200] between the NiO/Al reactants [420] and the Ni diluent [350] corresponds to a distance between a midpoint among the NiO/Al reactants [210] and a midpoint of the Ni diluent [215], and the average distance is the average of all the distances between the reactants and diluents, or a representative sample thereof.

Accordingly, in one embodiment, the average spacing between fuel and oxidizer is less than 10 μm in order to maintain the ability for the reactive composite to self-propagate. This decreased reactant spacing allows for more efficient and complete mixing during reaction, which leads to faster propagation and larger heat releases. In order to self-propagate, the rate at which heat is generated by the reaction must be greater than the rate at which heat is dissipated into the surroundings.

In one embodiment, the average reactant spacing is 5 μm or less. In another embodiment, the reactant spacing is 2 μm or less. In yet another embodiment, the average reactant spacing is 500 nanometers (nm) or less. In one embodiment, the average reactant spacing is between 50 nanometers (nm) and 2 μm.

In one embodiment, the reactivity of the reactive composite is enhanced by the separations of the reactants from the diluent. Excess metallic diluent decreases reaction efficiency by creating relatively non-reactive fuel/diluent interfaces and reducing the density of highly reactive fuel/oxide (e.g. Al/NiO) interfaces. Such geometric effects are likely whenever diluent powders are added to compacts of fuel and oxide powders.

In one embodiment, the average distance between the reactants and the diluent is less than 100 μm. In another embodiment, the average distance between the reactants and the diluent is less than 30 μm. In one embodiment, the average distance is less than 10 μm. In another embodiment, the average distance is less than 1 μm.

In one embodiment, the fuel particles and the oxidizer particles are formed into a composite, and the average distance between the composite and the diluent is less than 100 μm. In another embodiment, the average distance between the composite and the diluent is less than 30 μm. In one embodiment, the average distance between the composite and the diluent is less than 10 μm. FIGS. 3A and 3B illustrate an increase of reactive interfaces according to an embodiment. As illustrated in FIGS. 3A and 3B, the use of partially pre-oxidized Ni/NiO powders [30] in Al/NiO—Ni reactive composites increases the reactive interfaces [33] between the fuel and oxidizer as indicated by black arrows. For example, in the Al:NiO system illustrated in FIG. 3A, if Ni is added as an elemental powder to the Al:NiO reaction to reduce gas production, Al/Ni interfaces [35] form in addition to the desired Al/NiO interfaces [33]. Hence, the density of reactive Al/NiO interfaces is reduced and reaction efficiency drops. Further still, the average spacing [100] between the fuel (Al) and the oxide (NiO) increases. In contrast, according to embodiments in this disclosure, reactive composites using partially pre-oxidized (PPO) Ni particles [30]; that is, NI particles covered with a NiO layer [see FIG. 3(b)] mitigate these effects. As illustrated in FIG. 3B, the Al particles form interfaces [33] with only the oxide. This can reduce the average spacing of reactants significantly, thereby speeding the rate of atomic mixing, increasing the reaction velocities, and ultimately reducing the risk of quenching during the bonding process for highly-diluted thermite reactions.

To test the effect of particle geometry, conventional thermite mixtures (Al, NiO, and Ni powders) were compared with thermite mixtures that contain the oxidizer (NiO) and the diluent (Ni) as PPO particles. Both were based on the Al:NiO system and contain different amounts of Ni. Individual compositions are denoted as Al:NiO-nNi, where n is the weight fraction of Ni to dilute the mixture. In the conventional mixtures, the ratio of Al and NiO was kept constant according to the stoichiometry of the reaction $2Al+3NiO \rightarrow Al_2O_3+3Ni$. Up to 50 wt. % of Ni was added to achieve different degrees of dilution.

The second set of samples were compacts containing Al and PPO Ni powders. Ni powder was oxidized in still air at 550° C. for different durations between 8.5 min and 30 min. In one embodiment, the adequate choice of temperature depends on the diluent. While particle sintering should be minimized, oxidation kinetics have to be fast enough to grow NiO reproducibly in a reasonable amount of time. In order to further minimize particle sintering, the Ni powder was placed inside a quartz tube that was heated in air and continuously rotated inside a tube furnace. Particle movement substantially reduced the amount of sintering. After oxidation, the particles were sieved and only particle sizes <45 μm were used for further analysis and compaction with Al powder of similar size. The oxidized Ni-powders were analyzed in terms of morphology and nature of the oxide.

After mixing the oxide, fuel, and diluent powders thoroughly, the mixtures were poured into carbon steel tubes in small increments to avoid segregation and the filled tubes were swaged from an outer diameter of 15 mm down to an outer diameter of 3.2 mm (referred to as powder-in-tube technique). The swaged tubes were then rolled down to thin strips using multiple passes with 10% thickness reductions per pass. After removing the steel jacket, cold-formed, 500 µm thick Al:NiO-nNi thermite reactive composite foils were obtained.

In one embodiment, the composite reactive foil has a thickness of between 50 and 1500 microns (µm). In another embodiment, the composite reactive foil has a thickness of between 50 and 800 µm. In one embodiment, the composite reactive foil has a thickness of between 200 and 600 µm.

The PPO Ni particles were characterized with a quantitative XRD phase analysis. Table 1 illustrates a summary of the weight fractions of Ni as a function of oxidation time for the PPO particles. As illustrated in Table 1, a decreasing fraction of Ni corresponds to a duration of oxidation for a given Ni particle, resulting in a decreased amount of metal dilution. Systematic variation of the oxidation time hence allows us to obtain PPO particles containing specific Ni dilutions.

TABLE 1

| Time of oxidation (min) | Average fraction of Ni (wt. %) |
| --- | --- |
| 8.5 | 38 |
| 10 | 34 |
| 15 | 24 |
| 17 | 19 |
| 30 | 18 |

Figures 4A, 4B:
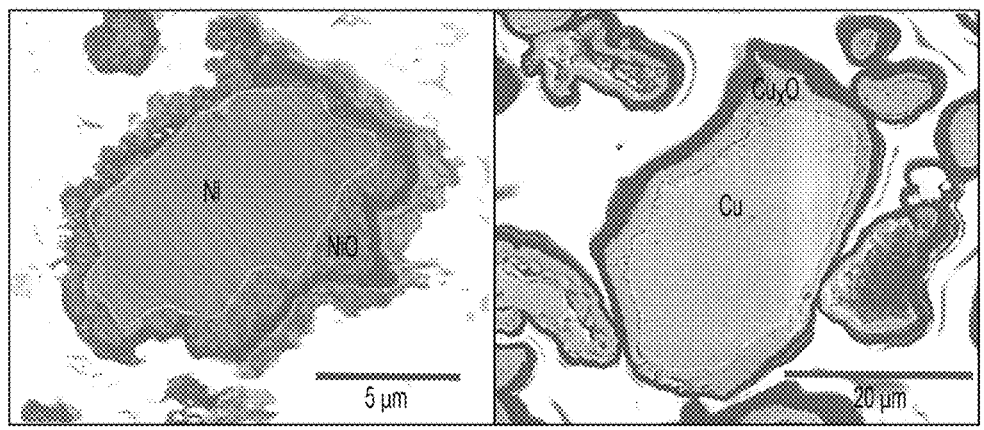
FIGS. 4A and 4B illustrate cross-sectional views of oxidized powders

Scanning electron microscopy (SEM) was used to reveal the morphology of the nickel oxide that grows on the surface of the Ni particles at 550° C. FIGS. 4A and 4B illustrate cross-sectional views of oxidized powders. As illustrated in FIG. 4A a cross-sectional view of an oxidized Ni powder after 10 min of oxidation shows a porous, discontinuous NiO scale. However, while the NiO scale on the surface of the particle is porous and discontinuous, a coated geometry is evident. While not limited to a single theory, the porous oxide scale may be an effect of oxidation conditions, resulting from either the atmosphere (static air) or the mechanical movement of the particles during the oxidation process. Yet, as illustrated in FIG. 4A, the NiO does form a closed scale around the Ni which should enable effective separation of the Ni diluent and the Al fuel in Al:NiO-nNi thermite compacts. An example of successful formation of a continuous oxidation scale is shown in FIG. 4B for Cu particles that have been oxidized using the same procedure than for the Ni powders. As illustrated in FIG. 4B, a cross-sectional view of an oxidized Cu powder after 10 min of oxidation shows a continuous $Cu_xO$ scale over the Cu particle. Accordingly, in one embodiment, the reactive composition includes an oxidized metal. In one embodiment, the oxidized metal is a powder. In another embodiment, the oxidized metal powder includes a metal core and a metal oxide surrounding scale. In yet another embodiment, the surrounding scale encapsulates the metal core.

The reaction behavior of the reactive composites as a function of excess metal diluent under low temperature conditions and under high temperature self-propagating conditions was characterized. Low-temperature behavior was captured by measuring the heats of reaction using differential scanning calorimetry (DSC), while high-temperature behavior of the self-propagating reaction was analyzed by probing the propagation front velocities, ejected particle and vapor mass fractions, and the maximal reaction temperatures.

Figure 5:
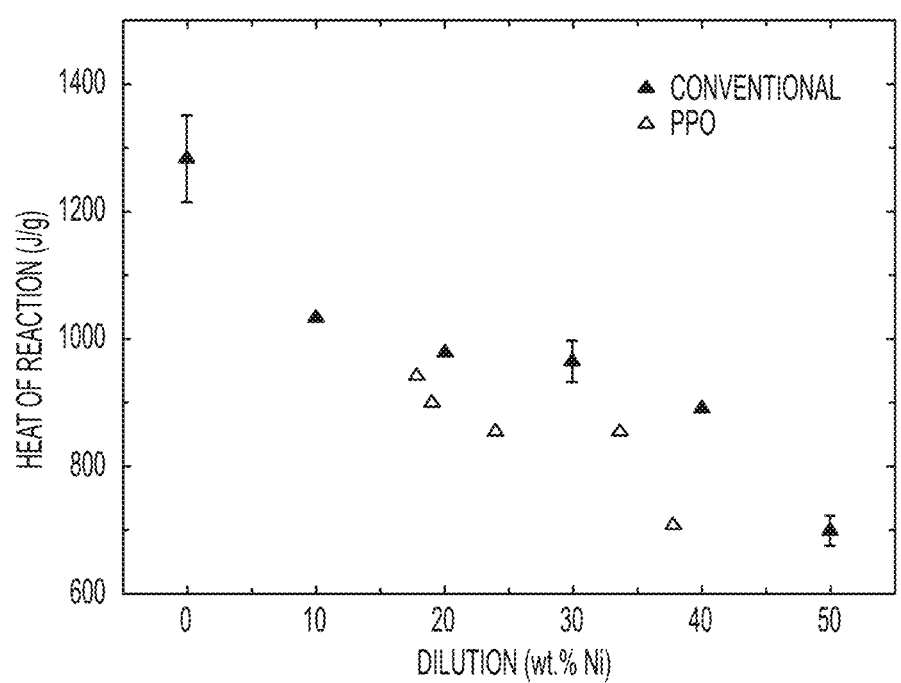
FIG. 5 illustrates partial heats of reaction for thermite composites.

FIG. 5 illustrates heats of reaction for thermite composites. In FIG. 5, the heat of reaction was calculated by integrating the DSC traces up to 725° C. The heats of reaction for conventional and PPO powder samples were plotted as a function of dilution, as shown in FIG. 5. For both sample types, the heats of reaction decrease with increasing excess Ni. Generally, the measured heats of reaction range from 0.2 to 0.36 times the full heat of reaction for the stoichiometric Al:NiO thermite reaction (3445 J/g). These low values can be attributed in part to the Ni dilution, but mainly to the fact that the reaction does not run to completion during the DSC scan. In FIG. 5, the measured heats plateau temporarily between 20 and 30 wt % Ni dilution, which may be attributed to Ni—Al intermetallic formation at low temperatures with higher concentrations of Ni. However, the conventional sample with 50 wt % Ni dilution (562.88±4.78 J/g) compares well with the 550 J/g heat measured for the Al:NiO-50 wt. % Cu mixtures. Thus, the heat of reaction appears to be similar at high dilutions when Ni or Cu diluents are used with the Al:NiO thermite reaction, even though Al and Cu have relatively low heats of reaction.

The DSC and XRD experiments identify two novel effects of the PPO particle geometry on the thermite reaction behavior, compared to conventional powder mixtures. First, the reaction begins at lower temperatures in the PPO samples, indicating a finer microstructure compared to the conventional samples. Microstructural analysis of the samples supports this argument of reduced reactant spacing for the PPO particle case. Second, the NiO coating around the Ni particles limits direct mixing between the excess Ni used for dilution and the Al surrounding the PPO particles. This indirectly demonstrates that the PPO particle geometry can physically separate the diluent from the thermite reactants, which becomes increasingly important for heavier dilutions.

The DSC study reveals two low temperature exothermic phase transformations before the Al solid solution starts to melt at 636° C. (eutectic melting). First $NiAl_3$ forms at around 400° C. before $Ni_2Al_3$ starts to evolve at 550° C. The DSC traces further show for the powder mixtures using the PPO powders a less intense $Ni_2Al_3$ transformation compared with the conventional foils. Hence, the $Ni_2Al_3$ formation does not dominate in the former foils. XRD results demonstrate this phenomenon.

Figure 13:
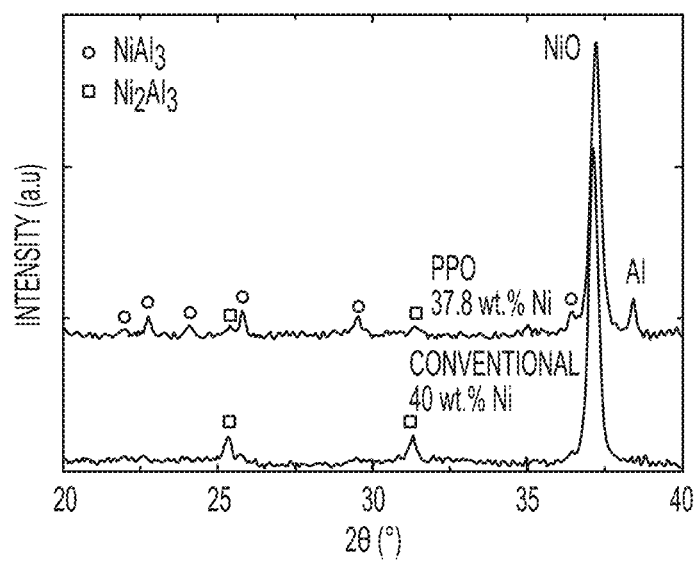
FIG. 13 illustrates a phase analysis.

FIG. 13 illustrates a phase analysis. In particular, FIG. 13 illustrates a phase analysis of samples quenched at 575° C. (after the $Ni_2Al_3$ formation). FIG. 13 compares the diffractograms of conventional and PPO samples with nearly equal dilution. For example, FIG. 13 compares the samples with the maximal degree of dilution at around 40 wt. % Ni for both types of foils. If the $Ni_2Al_3$ formation would be as dominant in both the cases, the diffractograms should reveal $Ni_2Al_3$ as the dominating intermetallic. However, FIG. 13 demonstrates for the PPO sample that $NiAl_3$ is the dominating phase in this kind of specimen. While not bound by any one theory, the difference in the transformation behavior may be due to the PPO geometry. In the foils using conventional materials excess Ni facilitates the $Ni_2Al_3$ formation. In case of the foils with the PPO particles, however, Ni is covered by a NiO shell preventing direct reaction between Ni and Al to form $Ni_2Al_3$. Very small reflections of $Ni_2Al_3$ can be revealed in the diffractogram of the PPO sample. One explanation is that the shell is partially broken enabling the reaction between Ni and Al to some extent. The presence of the elemental Al reflection at about 38° (contrasting the diffractogram of the conventional mixture), however, lends further support to the assumption that this reaction does not dominate. Accordingly, based on the XRD results in FIG. 13, the latter reaction is a minor reaction in the PPO samples caused by the shielding effect of the NiO.

In addition to characterizing the initial phase transformations at low temperatures and low heating rates with DSC, the self-propagation of these reactions was also analyzed. In a first set of experiments, high-speed videos of the reactions were captured. All samples show unstable reaction propagation in which reaction bands travel perpendicular to the net propagation direction until they impinge upon each other, followed by nucleation and growth of new bands. The sites for band nucleation are less tightly spaced in the diluted foils compared to the undiluted foils, making the reaction propagation appear more irregular and unstable with dilution.

Figure 6:
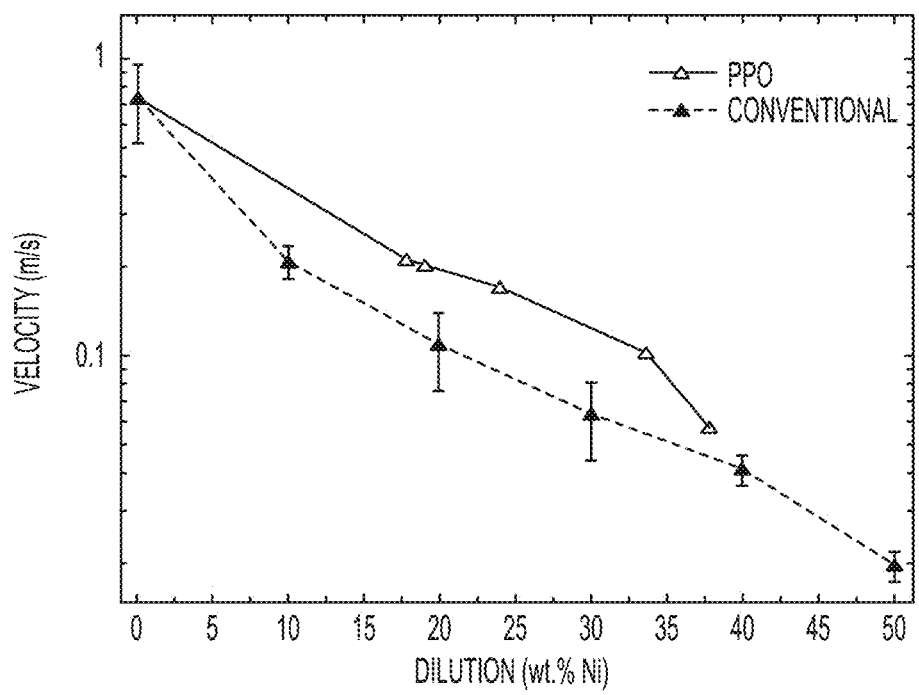
FIG. 6 illustrates reaction velocities of reactive composites.

FIG. 6 illustrates reaction velocities of reactive composites. In particular, FIG. 6 illustrates velocities of conventional and PPO reactive composites as a function of excess Ni. As illustrated in FIG. 6, the measured values decreased steadily for both sample types as dilution increases, dropping from approximately 0.7 m/s for no dilution to approximately 0.02 m/s for a 50 wt % dilution of Ni.

In addition to slowing the self-propagating reactions, the addition of Ni also changes the nature of the reaction behind the moving front. High-speed videos clearly reveal droplet formation and the spraying of molten products from the undiluted samples. However, for Ni dilutions greater than 20 wt. % droplet formation disappears and the reaction products coarsen to form large slugs in which the $Al_2O_3$ and elemental Ni products phase separate. More importantly, the ejection of mass from the samples decreases significantly with dilution.

Figure 7B:
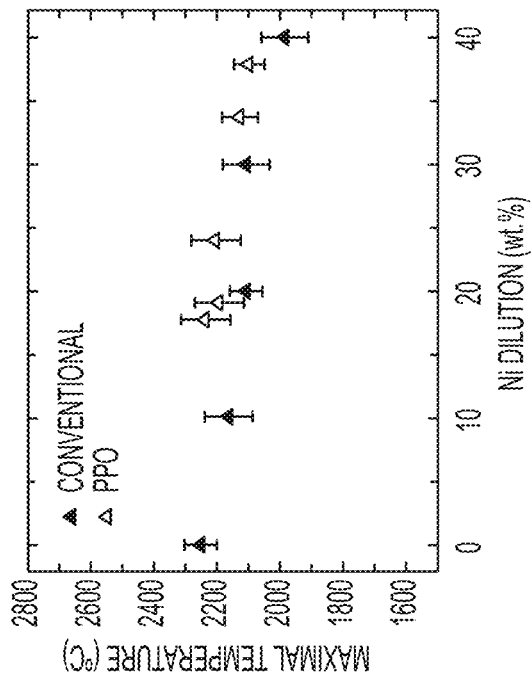
FIGS. 7A and 7B illustrate mass ejection percentages as a function of dilution and maximal temperatures as a function of excess diluent.
Figure 7A:
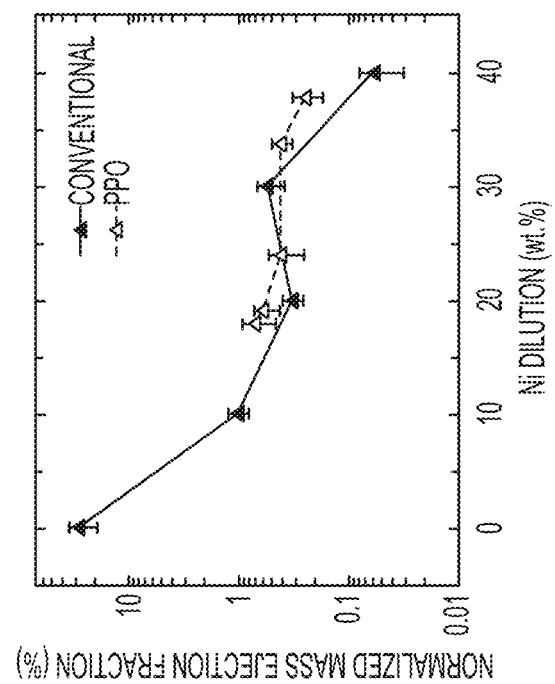

FIGS. 7A and 7B illustrate a mass ejection percentage as a function of dilution and maximal temperatures as a function of excess diluent. In particular, FIG. 7A plots the normalized mass ejection fraction as a function of excess Ni for both conventional and PPO mixtures. For the conventional samples the normalized mass ejection fraction drops by 2.5 orders of magnitude with increasing Ni dilution and plateaus between 10 and 30 wt. % Ni. Very similar behavior is seen for the PPO reactive composite foils across their full range of dilutions, from 17 wt. % to 37 wt. % Ni.

The maximum temperatures measured for the various samples as their reactions self-propagated are plotted in FIG. 7B. The values vary from 2250° C. for the undiluted specimens to 2000° C. for the 50 wt. % Ni sample and show a moderate plateau between 15 wt. % and 30 wt. % Ni. Given these temperatures are lower than the boiling points for the reaction products, $Al_2O_3$ (2,977° C.) and Ni (2730° C.), but relatively close to that for Al (2470° C.), it suggests that the ejection of mass from the samples can be attributed to the evaporation of Al. In addition, as dilution increases, the fraction of Al that evaporates decreases but the reaction temperature stays relatively constant.

While the conventional and PPO particle samples show similar trends in reaction velocity, mass ejection, and reaction temperature with dilution, the PPO particle samples clearly have higher reaction velocities. In one embodiment, the higher speeds are due to the unique geometry of the PPO particles. These particles insure that the Ni diluent is separated from the Al and does not react to form Al—Ni intermetallic compounds. Furthermore, the separation of the Ni diluent and the Al fuel shown schematically in FIG. 3 insures a finer spacing of Al and NiO reactants. Both of these factors can enhance a reaction velocity compared to conventional powder compacts as seen in FIG. 6. The boost in velocity is as large as 100% for a dilution of 30 wt. % Ni.

Figures 8A, 8B, 8C:
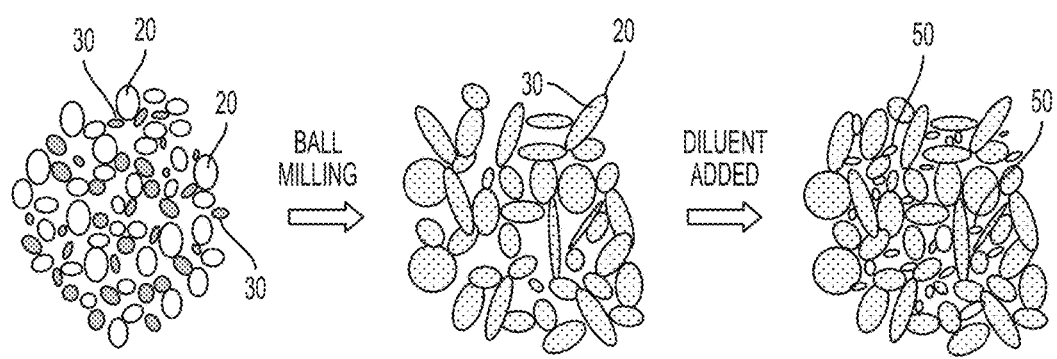
FIGS. 8A-C illustrates a method of increasing the reactivity of a reactive composite.

In another embodiment, a reactivity of the reactive composite is enhanced by mechanically alloying the starting fuel and oxide powders in the reactive composite. FIGS. 8A-C illustrates a method of increasing the reactivity of a reactive composite. Another means of separating the reactive material from the diluent is to mechanically alloy the starting fuel and oxide powders by ball milling. With high-energy ball-mills, such as a SPEX 8000 shaker mill, the impact energy conferred by the grinding media (the vials and the balls placed inside the vial) to the powder causes the individual powders to continuously fracture and cold weld. The desired composite powder is created when small pieces of oxide are cold welded into the fuel particles under the correct impact conditions. The brittle oxide powders will break into many smaller pieces faster than the more ductile metal fuel, which yields fine reactant spacing after multiple small oxide pieces become welded into a fuel particle creating the composite as depicted in FIG. 8A-C. This process also allows the oxide to be finely dispersed within the fuel particle.

For example, FIG. 8A illustrates a schematic of powders without any milling. The fuel powders [20] and oxide powders [30] are mixed but there is not always intimate contact between the oxide and the fuel. FIG. 8B illustrates a schematic of ball-milled powders, showing that the oxide [30] is finely dispersed within larger fuel particles [20], thus creating shorter diffusion distances during reaction. There is also more complete contact between the oxide and fuel that enhances diffusional atomic mixing. FIG. 8C illustrates a diluent [50] that may be added and mixed with the composite particles, but not hindering the reactant spacing.

Since the composite particles contain both the fuel and the oxidizer, when mixed or consolidated with diluent powders, the spacing between the reactive components remains unaffected. This allows for more diluent to be added in comparison to combining fuel, oxidizer, and diluent powders where no ball-milling has been performed. In some embodiments, when no milling is performed, much of the added diluent is placed directly between fuel and oxidizer, which on average, will increase the reactant spacing due to the inert diluent being between the fuel and the oxidizer.

Figure 9:
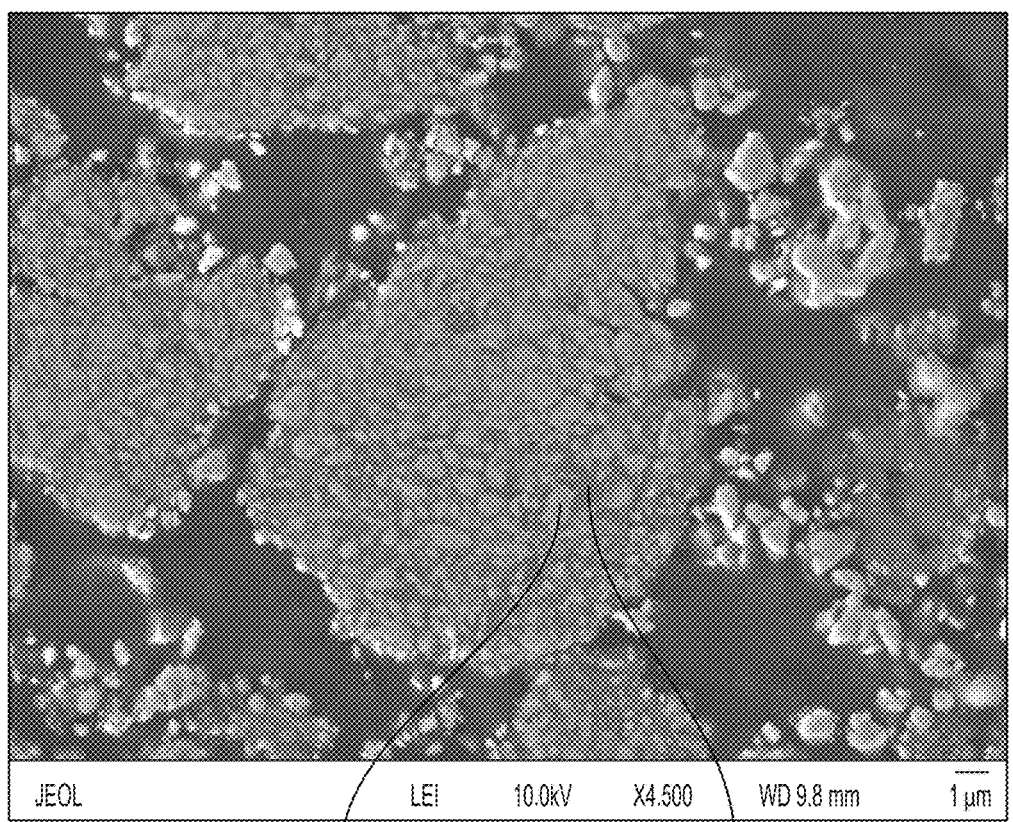
FIG. 9 illustrates an SEM image of a ball-milled powder.

With ball-milled powders, the fuel and oxidizer are in intimate contact with one another as part of work hardened composite particles. As a result the composite particles may not deform easily during further mechanical processing and thus additional effort will be needed to further reduce the average reactant spacing during subsequent mechanical processing steps (rolling and swaging). However, since the average reactant spacing of the fuel and oxidizer is already below 10 microns, and in some embodiments sub-micron, further refinement may not be necessary to achieve enough reactivity for high levels of dilution. FIG. 9 illustrates an SEM image of a ball-milled powder. In particular, FIG. 9 illustrates cross sections of Al:NiO ball-milled particles mounted in epoxy. As illustrated in FIG. 9, dark grey components are aluminum while the light grey is the nickel oxide included in the composite particle.

Figure 10:
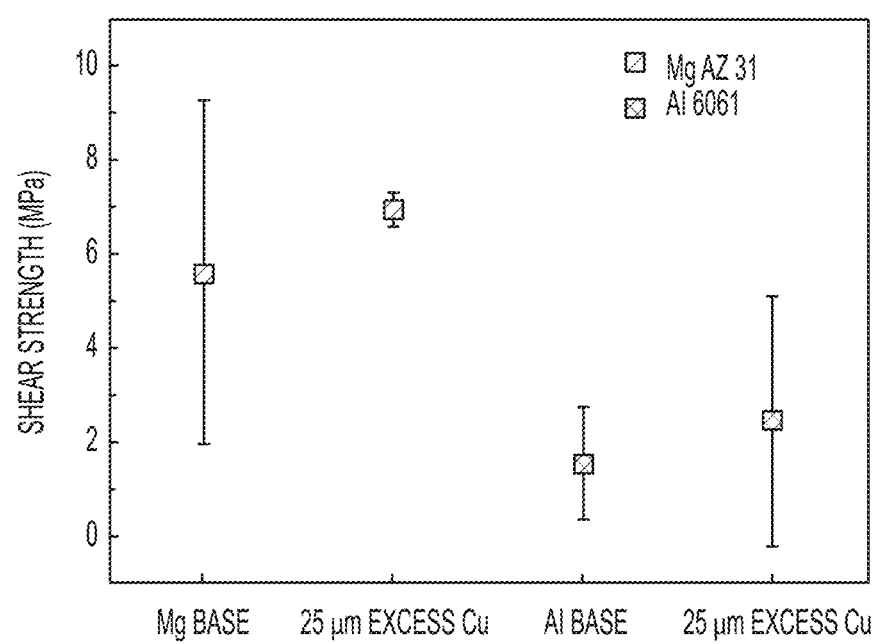
FIG. 10 illustrates an increase of overall bond strength for reactive compositions.

In one embodiment, in order to create a strong, reliable bond, it is necessary to maximize the amount of molten metal that appears near the interface with the reactive composite and the metal to be bonded. This can be done by placing sheets of braze material between the bonding metal and the reactive composite, or incorporating the braze material into the reactive composite structure itself. The added braze material increases the strength of the bond by maintaining a continuous layer of braze metal at the interface with the bonding metal, without any voids or alumina particles created during the propagation of the reactive composite. In some embodiments, a continuous layer of braze metal can wet the surface of the bonding metal in addition to or instead of the products from the reactive composite, resulting in stronger bonds. Increased bond strength for added sheets of elemental copper is displayed in FIG. 10. FIG. 10 illustrates an increase of overall bond strength. In particular, FIG. 10 illustrates an increase in the overall strength of the bond according to addition of sheets of elemental copper between the reactive composite and the base metal.

Figure 11:
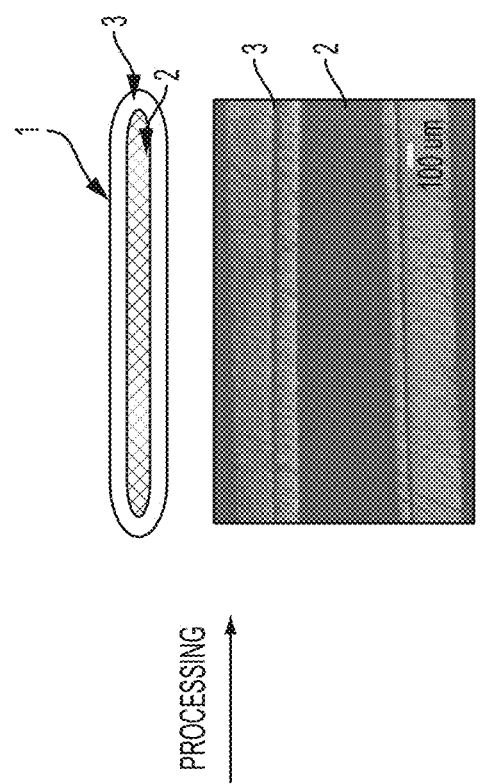
FIG. 11 illustrates a method of cladding a reactive composite.

FIG. 11 illustrates a method of cladding the reactive composite. Cladding the reactive composite in braze material can be incorporated into the mechanical fabrication process as depicted in FIG. 11. Before packing the swaging tube [1] with powders [2], a smaller tube [3] of braze material is inserted. The reactive powders [2] needed to fabricate the reactive composite are then placed inside this smaller diameter tube [3]. After normal processing procedures of radial reductions via swaging, and planarization by rolling, a composite structure with a continuous braze layer surrounding the reactive composite is realized. The thickness and composition of the braze layer can be adjusted by changing the properties of the initial cladding tube [3]. Thus, the braze layer [3] can be tailored for different bonding configurations.

As illustrated in FIG. 11, before the mechanical refinement, a second tube [3] is placed inside the swage tube [1] to encapsulate the powders (2)—in this case, a copper tube. After processing, the reactive composite will be surrounded by this additional braze layer [3], which will be in contact with the material to be bonded. A schematic cross section of a resulting reactive composite foil is depicted in the upper right, while a cross section of an actual reactive composite foil is provided in the bottom right.

In one embodiment, the reactive composite foil includes a cladding layer. In one embodiment, the cladding layer forms 50% or less of the total reactive composite foil thickness. In another embodiment, the cladding layer forms 20% or less of the total reactive composite foil thickness. In one embodiment, the cladding layer forms 10% or less of the total reactive composite foil thickness.

In one embodiment, diffusion of the thermite reaction is enhanced by alloying. For example, alloying the fuel and/or oxidizer can enhance mass diffusion. In particular, to substantially increase the adsorption and release of oxygen by the fuel and oxidizer, respectively, to facilitate the oxygen transfer between the components. In one embodiment, acceleration and stabilization of the reaction front and, consequently, a reduction in the risk of reaction quenching is achieved, and in other embodiments, minimization of the released oxygen to the environment to decrease the pressure build-up during the reaction is also achieved.

In one embodiment, alloying increases the rate of oxidation. For example, in one embodiment, the fuel particles are alloys that increase the rate of oxidation for the thermite reaction. In one embodiment, the fuel particles include less then 5% in total of one or more of the following elements that form $M^{2+}$ metal ions: Ba, Ca, Co, Cu, Fe, Ni, and Sr. In one embodiment, the fuel particles include less then 5% of Cu, Fe, or Ni. In another embodiment, the fuel particles include less then 3% in total of one or more of the following elements that form $M^{2+}$ metal ions: Ba, Ca, Co, Cu, Fe, Ni, and Sr. In another embodiment, the fuel particles include less then 3% of Cu, Fe, or Ni. In one embodiment, the fuel particles include less then 1% in total of one or more of the following elements that form $M^{2+}$ metal ions: Ba, Ca, Co, Cu, Fe, Ni, and Sr. In one embodiment, the fuel particles include less then 1% of Cu, Fe, or Ni.

In one embodiment, alloying increases wetting of the materials to be bonded. For example, in one embodiment at least one of the braze or the cladding layer are alloyed with metals that increase the wetting of the materials to be bonded by the braze or cladding metal. In one embodiment, at least one of the braze or the cladding layer are alloyed with one or more of Ti, Cu, Ni, Ag, Au, Al, Sn, In, Cr, Si, Pd, Ge, Pt, Co, Mn, Mg, Zn, Bi, Be, and alloys thereof. In another embodiment, at least one of the braze or the cladding layer are alloyed with one or more of Cu, In, Ti, Zr, Sn, Au, Ag, and alloys thereof. In one embodiment, at least one of the braze or the cladding layer are alloyed with one or more of Cu, In, Ag, Ti, Zr, and alloys thereof.

In one embodiment, alloying decreases coarsening of the products of the thermite reaction. For example, when the fuel particle includes Al, alloying decreases the coarsening of the alumina product. In one embodiment, at least one of the diluent, the oxidizer particles, and the cladding layer is alloyed with elements that are soluble in the braze product and decrease interfacial energy between alumina and braze. In another embodiment, at least one of the diluent, the oxidizer particles, and the cladding layer is alloyed with elements which do not increase gas generation. In one embodiment, at least one of the diluent, the oxidizer particles, and the cladding layer is alloyed with elements which are readily available, do not increase gas generation, and maintain ductility of the bond.

In one embodiment, the thermal conductivity of the composite reactive foil is decreased. For example, at least one of the oxidizer particles, the diluent, and the cladding, will include a solute to decrease thermal conductivity. In one embodiment, at least one of the oxidizer particles, the diluent, and the cladding is alloyed with one or more of Cu, Ni, Fe, Al, and alloys thereof. In another embodiment, at least one of the oxidizer particles, the diluent, and the cladding is alloyed with at least one or more of Cu, Ni, Fe, and alloys thereof.

For example, in the following description, the concept of enhancement by alloying is described using the model thermite system Al:NiO. In some embodiments, the reactive composite includes a metal. In one embodiment, the metal is a metal alloy.

During the initial stages of oxidation aluminum and its alloys develop a thin film of amorphous $\gamma$-$Al_2O_3$. This layer provides protection between the metal and the environment and also controls the early stages of crystalline oxide film growth at higher temperatures. Between 425 and 450° C. the amorphous oxide undergoes a transformation into a crystalline structure. Above 450° C., crystalline $\gamma$-$Al_2O_3$ starts to grow underneath the amorphous layer. Further growth of the amorphous layer occurs at the oxide/atmosphere interface whereas the crystalline layer grows inward at the metal oxide interface. The high temperature surface films are usually duplex structures comprising an amorphous as well as a crystalline sub-layer.

The amorphous film is important when considering alloying effects because additional elements change the film thickness and/or the ionic transport properties. Alloying elements, as well as impurity elements, affect the growth and composition of the oxide. However, in embodiments present in the disclosure, the inventors aim toward an acceleration of the oxide growth. This is opposite to the common technological interest where oxidation kinetics should be minimized. However, the inventors have found that for thermite reactions the oxygen released by the oxidizer should be readily adsorbed by the fuel (Al) if there is to be a fast oxidation rate.

One series of alloys that are frequently studied are Al—Mg alloys. It has been shown that small amounts of Mg additions decrease the oxidation rate. High concentrations of Mg (>1%) accelerate the kinetics. Further still, the oxidation products are now two-phased comprised of $\gamma$-$Al_2O_3$ and MgO.

Another series of Al alloys known for their high tendencies to oxidize are the 8000 series, where Li is the primary alloying metal. Li is known to oxidize preferentially in Al—Li alloys due to its higher diffusivity and because its oxides are more stable than $Al_2O_3$. The addition of lithium to aluminum alloys can increase the elevated temperature oxidation rates by one or two orders of magnitude. This is a consequence of the high diffusivity and reactivity of lithium and of the non-protective nature of the lithium containing oxidation products on the surface of Al—Li alloys. Lithium oxidizes preferentially at the free surface of Al—Li alloys and many oxidation reactions are thermodynamically favored. The following Reactions (1) to (4) are in order of decreasing $\Delta G$, the free energy change, and lead to the products most frequently detected on Al—Li alloy surfaces:

$$4Li + O_2 \rightarrow 2Li_2O \quad (1)$$

$$2.5Li + 0.5Al + H_2O \rightarrow 0.5LiAlO_2 + 2LiH \quad (2)$$

$$2Li + H_2O \rightarrow Li_2O + H_2 \quad (3)$$

$$Li_2O + CO_s \rightarrow Li_2CO_3 \quad (4)$$

Oxidation studies on 8090 alloy at 500° C. suggested that $Li_2O$ occurred in dry air (Reaction 3) and $LiAlO_5$ in moist air. The $Li_2O$ phase tends to react in air at room temperature to form LiOH and $Li_2CO_3$ (Reaction 4). After oxidation of 8090 alloy in laboratory air at 530° C. for times less than 5 min, lithium and magnesium oxides were detected. The oxide $Li_5AlO_4$ increased with time and $Li_2CO_3$ was observed after 5 min; after 60 min $LiAlO_2$ (Reaction 2) was detected. The most common phases on the 2090 alloy oxidized at 550° C. in dry and moist air were $LiAlO_2$, $LiAlO_2$ and $Li_2CO_3$. The latter phase tends to become dominant on these alloys after long exposure times in air. The incorporation of lithium into the $Al_2O_3$ film is known to dramatically reduce the resistance to oxidation, and the initial parabolic weight gain curve associated with the formation of oxides and spinels changes to a linear weight gain curve as the $Li_2CO_3$ phase increases. Volume changes and thermal stresses cause cracking of surface films and the surface area may be increased by porosity associated with hydrogen or Kirkendall diffusion.

While Mg and Li addition aid oxidation rates at low to moderate temperatures, both elements have low vaporization temperatures and hence are not good alloying elements for enhancing the rate of oxidation when reactions occur at high temperatures. The Mg and Li will evaporate and will cause vapor formation and porous bonds. Thus, other elements that form $M^{2+}$ metal ions and have much higher evaporation temperatures are desirable for alloying with Al. These include Ba, Ca, Co, Cu, Fe, Ni, and Sr.

Self-propagating reactions quench when the heat lost from the reaction front is greater than the heat generated, causing a net heat loss. This continues until the reaction is no longer self-sustaining. The geometry of the reactive composites, coupled with the bonding configuration, dictates that the much of conductive heat losses occur down the length of the reactive composite foil, parallel to the propagation direction, as opposed to laterally through the thickness and into the bonding components.

In one embodiment, alloying the braze material or cladding with elements such as Cu, Ni, Fe, Al, Ti, or Zr decreases the foil's thermal conductivity and reduces the risk of the reaction quenching.

In another embodiment, alloying the fuel decreases the foil's thermal conductivity and reduces the risk of the reaction quenching. Examples include adding Ba, Ca, Co, Cu, Fe, Ni, and Sr which will also help enhance oxygen diffusion as the Al oxide forms.

In one embodiment, alloying the braze material increases its wetting behavior. As with any surface joining technique, such as brazing, the ability to wet the joining components by a molten material is critical for obtaining strong joints. If the braze does not wet the surface of the materials to be bonded, then the joint interface will be porous or unbounded and easily fail. Wetting can be individually tailored to the surface to be joined by altering the diluent added to the reactive composite such that after the initial metal oxide is reduced, its surface energy is altered due to the chemistry of the diluent, thus increasing its wettability of the molten braze material. This may also be achieved by altering the chemistry of any cladding layers added in the fabrication of the reactive composite.

To increase wettability of the joining components it may also be necessary to use compositions that will initiate reactive wetting. In reactive wetting the molten metal and joining material chemically react to form new phases. The native oxide on some metals, such as aluminum, make brazing very difficult because the braze may not effectively wet the native oxide. In one embodiment, this limitation can be overcome again by alloying the braze material (diluent) with species that will chemically react with the oxide layer and underlying metal to form a chemical bond. An example of this is using Ni—Ti alloys to help the adhesion to the alumina. The addition of titanium introduces semi-metallic titanium oxides which will increase the work of adhesion, and therefore the wettability of the brazing alloy on the substrate. In some embodiments, these reactive braze elements may be added to the reactive composite.

In addition, in some embodiments, the alloy may be used to inhibit growth and agglomeration of the metal oxide, such as alumina. For example, to increase the strength of resulting bonds, it is necessary to remove as much alumina as possible from the joint interface and/or decrease the size of the alumina inclusions imbedded in the braze layers. The braze layer is less likely to delaminate if the included oxide is small in size so that there is a continuous path of braze through the thickness and width of the braze layer. To reduce the amount of alumina in the bond, one can simply dilute the system with excess metal. Table 2 shows how the volume percent of alumina decreases with increasing dilution for Ni and Cu-based thermite systems.

TABLE 2

Theoretical, post-reaction braze and alumina volume fractions as a function of thermite system and dilution.

| System | Dilution | | Vol. % Braze | Vol. % Alumina |
|--------|----------|---|--------------|----------------|
| Al:CuO | Cu | 0 | 45.2% | 54.8% |
| Al:CuO | Cu | 10 | 49.1% | 50.9% |
| Al:CuO | Cu | 20 | 53.3% | 46.7% |

TABLE 2-continued

Theoretical, post-reaction braze and alumina volume fractions as a function of thermite system and dilution.

| System | Dilution | Vol. % Braze | Vol. % Alumina |
|---|---|---|---|
| Al:CuO | Cu | 30 | 57.7% | 42.3% |
| Al:CuO | Cu | 40 | 62.5% | 37.5% |
| Al:CuO | Cu | 50 | 67.6% | 32.4% |
| Al:CuO | Cu | 60 | 73.1% | 26.9% |
| Al:$Cu_2O$ | Cu | 0 | 62.2% | 37.8% |
| Al:$Cu_2O$ | Cu | 10 | 65.3% | 34.7% |
| Al:$Cu_2O$ | Cu | 20 | 68.5% | 31.5% |
| Al:$Cu_2O$ | Cu | 30 | 71.8% | 28.2% |
| Al:$Cu_2O$ | Cu | 40 | 75.3% | 24.7% |
| Al:NiO | Ni | 0 | 43.4% | 56.6% |
| Al:NiO | Ni | 10 | 47.4% | 52.6% |
| Al:NiO | Ni | 20 | 51.6% | 48.4% |
| Al:NiO | Ni | 30 | 56.2% | 43.8% |
| Al:NiO | Ni | 40 | 61.1% | 38.9% |

In order to decrease the size of the alumina inclusions, one must decrease the surface energy of the molten alumina when it phase separates from the molten metal during the thermite reaction. In one embodiment, this can be accomplished by alloying the diluent so that the surface energy between the braze and the alumina particles decreases, resulting in more, smaller alumina particles within the braze layer. In another embodiment, this can be accomplished by alloying the fuel metal, for example Al, so that the surface energy between the braze and the alumina particles decreases, resulting in more, smaller alumina particles within the braze layer.

Figure 12:
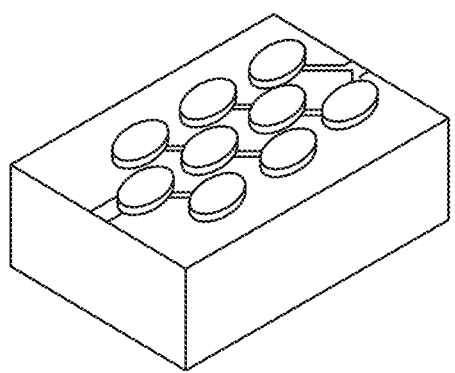
FIG. 12 illustrates a patterned reactive composite.

In another embodiment, the reactive composite may be patterned to promote the flow of braze. For example, bond strength and ductility may also be improved by promoting flow of molten braze throughout the bond area. This may be done by placing a series of thermite "islands" in the joint. In one example, these islands are connected using a secondary reactive composite foil, which upon ignition, propagates through the bond and ignites each island. FIG. 12 illustrates a patterned reactive composite. In particular, FIG. 12 illustrates an example of a thermite "island" network, where circular or ellipsoidal thermite islands are connected by paths of secondary reactive composite foil.

As illustrated in FIG. 12, the increase in surface area of the patterned reactive composite promotes flow of molten braze in the bond. Separate islands may also be ignited once molten material from a previous island spreads onto the unreacted island.

Creating a non-continuous or patterned reactive composite foil also creates channels for gas and/or particulate to be expelled from the bonding area. With thermite islands, as gas is expelled, it is allowed to expand and exit from the bond area before the molten braze spreads out and coats the base metal. This decreases the amount of voids in the resulting bond.

The islands also provide the added benefit of providing pathways for the alumina to exit the bond interface. During the thermite reaction the molten metal and alumina will phase separate. Since it is less dense than the molten metal the alumina can be ejected from the bond area during the process of expelling gas.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof.

The invention claimed is:

1. A reactive composite foil, comprising:
a reactant powder comprising a plurality of metallic fuel particles and a plurality of oxidizer particles; and
a diluent,
wherein an average particle size of the plurality of metallic fuel particles and the plurality of oxidizer particles is less than 200 μm in diameter,
wherein, the reactive composite foil produces a thermite reaction to produce a molten metal when ignited,
wherein, the reactive composite foil has a first mass before the thermite reaction and a second mass after the thermite reaction, and
wherein, the diluent reduces an amount of gas during the thermite reaction, such that when ignited in an inert environment, the second mass is less than the first mass by 5% or less.

2. The reactive composite foil of claim 1, wherein the diluent is configured to act as a heat sink to reduce a maximum reaction temperature of the thermite reaction.

3. The reactive composite foil of claim 1, wherein thermite reaction is a self-propagating thermite reaction.

4. The reactive composite foil of claim 1, wherein the reactive composite foil is configured to bond two materials via the thermite reaction without requiring pre-wetting or metallization of the materials to be bonded.

5. The reactive composite foil of claim 1, wherein a thickness of the reactive composite foil is between 50 μm and 1500 μm.

6. The reactive composite foil of claim 1, wherein, when ignited in an inert environment, the second mass is less than the first mass by 0.5% or less.

7. The reactive composite foil of claim 1, wherein the plurality of oxidizer particles include metal oxides, and the diluent comprises the metal of said metal oxides.

8. The reactive composite foil of claim 1, wherein the reactant powder comprises a plurality of composite particles formed of milled metallic fuel particles and oxidizer particles.

9. The reactive composite foil of claim 1, wherein the plurality of oxidizer particles comprise a plurality of partially pre-oxidized (PPO) metal particles, the PPO metal particles comprising a metal and a metal oxide surrounding the metal.

10. The reactive composite foil of claim 9, wherein the metal oxide of the PPO metal particles completely surrounds the metal of the PPO metal particles.

11. The reactive composite foil of claim 1, further comprising a metallic clad layer.

12. The reactive composite foil of claim 11, wherein, when the reactive composite foil is used to bond materials, the metallic clad layer is configured to wet the materials to be bonded and to act as a braze.

13. The reactive composite foil of claim 1,
wherein an average spacing between the metallic fuel particles and the oxidizer particles is less than 10 μm, and
wherein an average distance between the diluent and the reactant powder is less than 100 μm.

14. The reactive composite foil of claim 1,
wherein an average particle size of at least one of the plurality of metallic fuel particles and the plurality of oxidizer particles is less than 100 μm in diameter, wherein an average spacing between the metallic fuel particles and the oxidizer particles is less than 5 µm, wherein an average distance between the diluent and the reactant powder is less than 30 wherein a thickness of the reactive composite foil is between 50 µm and 800 µm, and wherein, when ignited in an inert environment, the second mass is less than the first mass by 0.1% or less.

15. A reactive composite foil, comprising:

a reactant powder comprising a plurality of metallic fuel particles and a plurality of oxidizer particles; and a diluent in an amount sufficient to reduce gas produced by a thermite reaction, wherein an average spacing between the metallic fuel particles and the oxidizer particles is less than 10 µm, wherein an average distance between the diluent and the reactant powder is less than 100 µm, and wherein, the reactive composite foil produces the thermite reaction to produce a molten metal when ignited.

16. The reactive composite foil of claim 15, wherein an average particle size of at least one of the plurality of metallic fuel particles and the plurality of oxidizer particles is less than 100 µm in diameter, wherein the average spacing between the metallic fuel particles and the oxidizer particles is less than 5 µm, wherein the average distance between the diluent and the reactant powder is less than 30 wherein a thickness of the reactive composite foil is between 50 µm and 800 µm, wherein, the reactive composite foil has a first mass before the thermite reaction and a second mass after the thermite reaction, and wherein, when ignited in an inert environment, the second mass is less than the first mass by 1% or less.

17. The reactive composite foil of claim 15, wherein the diluent is configured to act as a heat sink to reduce a maximum reaction temperature of the thermite reaction of the reactive composite foil.

18. The reactive composite foil of claim 15, wherein the plurality of oxidizer particles comprise a plurality of partially pre-oxidized (PPO) metal particles, the PPO metal particles comprising a metal and a metal oxide surrounding the metal.

* * * * *